Jan. 16, 1951     H. ESCHER     2,538,446
RECUPERATOR MEANS FOR COMBUSTION FURNACES

Filed Dec. 27, 1944     4 Sheets-Sheet 1

Inventor
H Escher

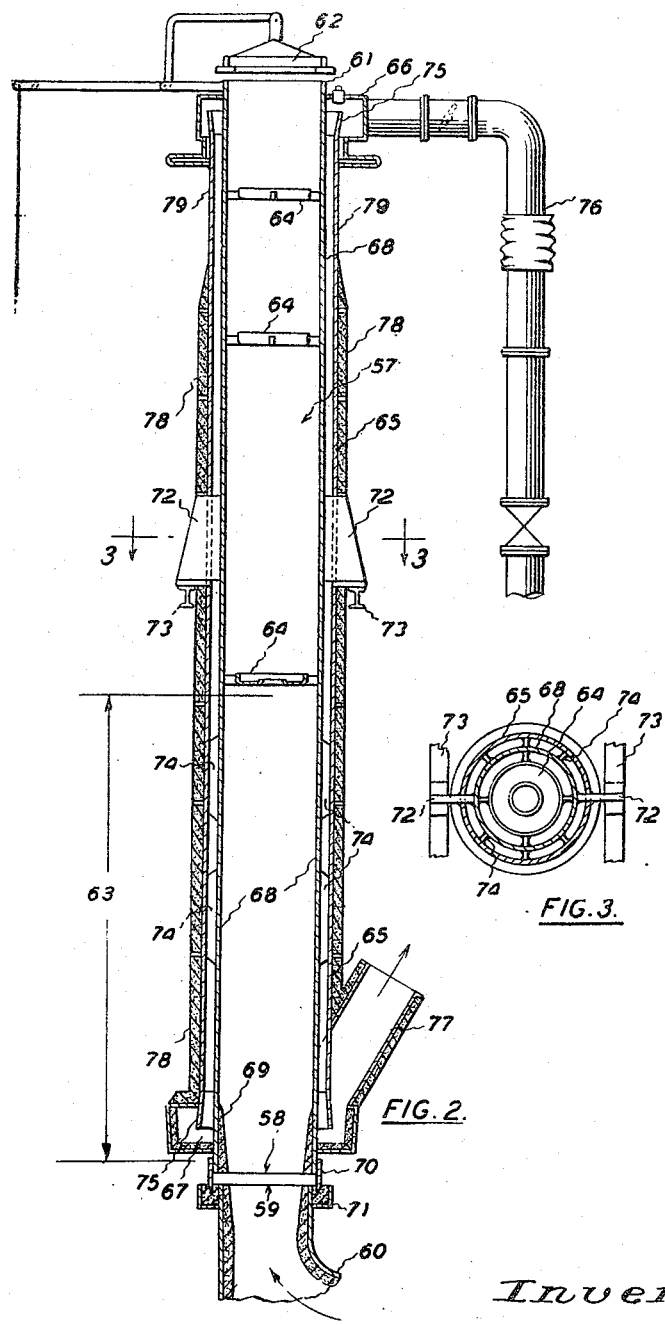

Inventor
H. Escher

Patented Jan. 16, 1951

2,538,446

UNITED STATES PATENT OFFICE 2,538,446

RECUPERATOR MEANS FOR COMBUSTION FURNACES

Hans Escher, Wollongong, New South Wales, Australia, assignor to Australian Iron & Steel Limited, Sydney, New South Wales, Australia, a company of New South Wales Application December 27, 1944, Serial No. 570,020
In Australia April 4, 1944

16 Claims. (Cl. 263—15)

This invention relates to combustion furnace recuperators for heating air or other gases or gas mixtures by heat exchange between the gas to be heated and the products of combustion exhausting from the furnace. The invention is particularly applicable to high temperature furnaces such as those used for metal melting, and glass and steel manufacturing purposes.

Recuperators are known in which the main stream of flue gases is divided into a number of smaller streams in order to obtain satisfactory heat transfer from the flue gases to the gas or air to be heated by direct contact between the gases and the partitions dividing the flue gas stream. Frictional losses are high in such arrangements, both for the flue gases and the gas or air to be heated; heat transfer is not efficient, owing to the uneven distribution of gases in the various passages, which is further aggravated by clogging of the passages in operation, and a large proportion of the heat transfer surfaces are inaccessible for inspection, cleaning and repairs.

According to the present invention the above disadvantages are avoided by making use of the heat radiating power of the flue gases and suspended particles. Heat radiation from flue gases containing carbon dioxide, water vapour, fumes and suspended particles increases rapidly with increasing temperature thereof, and, accordingly, the recuperator of this invention offers particular advantages in just those cases, namely where the flue gases from high temperature furnaces are to be used, where the prior art recuperators are most inefficient.

The objects of this invention include the provision in a recuperator, of means whereby a substantial portion of the heat transfer from the flue gases is effected by heat radiation, frictional losses are reduced, the flue gases have a substantially unobstructed passage, dead pockets of gas are largely eliminated, a comparatively small volume of gas or air to be heated is enclosed in the recuperator (thereby reducing danger when combustible gases are pre-heated in the recuperator), the gas or air to be heated flows at comparatively high velocity through the gas heating passage, and the said gas or air is distributed substantially uniformly through the gas heating passage.

The above and other objects of this invention are achieved by employing a large substantially unobstructed conduit between the recuperator entrance and outlet for the flue gases, by surrounding the conduit by a shell spaced close thereto to define a gas heating passage, and by surrounding the ends of the shell by gas inlet and outlet boxes. The inlet and outlet boxes enable the gas or air to be heated to be distributed substantially uniformly to the gas heating passage, and furthermore allow pressure losses at the ends of the gas heating passage to be reduced by flaring the ends of the shell outwardly in the boxes.

It is a further object to provide for expansion due to temperature changes without unduly reducing the rigidity of the recuperator. To effect this object the inlet and/or outlet boxes and/or outer shell are made sufficiently flexible to allow for such expansion. The said expansion may be employed to control the flow of cooling gases to the recuperator.

It is a further object to provide a recuperator which tends to automatically correct for overheating thereof, and to achieve this object portion of the shell, which normally does not radiate heat to the atmosphere, is unlagged so that when excessive temperatures obtain the unlagged parts can radiate to the outside atmosphere.

It is a further object to provide a recuperator having inlet and outlet boxes for the gas to be preheated in which the parts of the conduit enclosed by the boxes are as effective for heat transfer as the rest of the heating surface of the conduit. To effect this object the ends of the shell are extended for substantial distances into the boxes, and preferably have flared ends to reduce pressure losses and to effect a better distribution of the gas to be preheated.

The recuperator of the present invention allows high preheat temperatures to be obtained with less danger of localised overheating than with other types using individual tubes of small diameter. Hot spots are automatically equalised by radiation interchange within the conduit and to the outer shell and by sideways transfer through the heating surface of the conduit itself. With this construction the flue gases can be guided centrally so that they do not impinge at right angles against a section of the heating surface, thus reducing the possibility of hot spots, and allowing very high temperatures of the flue gases well above the allowable safe working temperature of the materials used in the construction of the recuperator.

The present invention consists in a combustion furnace recuperator, comprising a conduit which has an entrance end adapted to receive flue-gas exhausting from the flue-gas outlet of a furnace, which has its other end in communication with atmosphere, and which incorporates an internally unobstructed radiant heating zone having one end substantially coincident with said entrance end, a shell which surrounds said conduit and therewith defines a gas (air or other gas) heating passage, a gas inlet box wherethrough gas may be entered into one end of said passage, and a gas outlet box wherethrough gas may be conducted away from the other end of said passage. The cross-sectional shape of the recuperator main parts, such as the conduit and the surrounding shell, is preferably (though not necessarily) circular, and the arrangement is such that flue-gas proceeding from furnace to atmosphere is substantially unobstructed and is not subjected to repetitive changes of flow direction throughout that journey. This lack of obstruction is particularly desirable in the radiation zone in order to reduce wear and tear by ash, slag and the like on the walls of this zone. It is also preferable for further minimisation of wear and tear in the radiation zone for the flue-gas stream therein to be relatively slow moving. To this end, and in order to enhance radiation efficiency, the said zone is made of relatively large cross-sectional area. This cross-sectional area (or the least cross-sectional area) of the radiation zone is preferably not less than that of the furnace flue-gas outlet.

Examples of the invention are illustrated in the accompanying drawings which are more or less schematic.

Fig. 2 is a sectional side elevation of an alternative embodiment of a recuperator intended for operation at somewhat lower temperatures than is the case with the construction shown in Fig. 1;

Fig. 3 is a section taken on the line 3—3 of Fig. 2;

Figure 1:
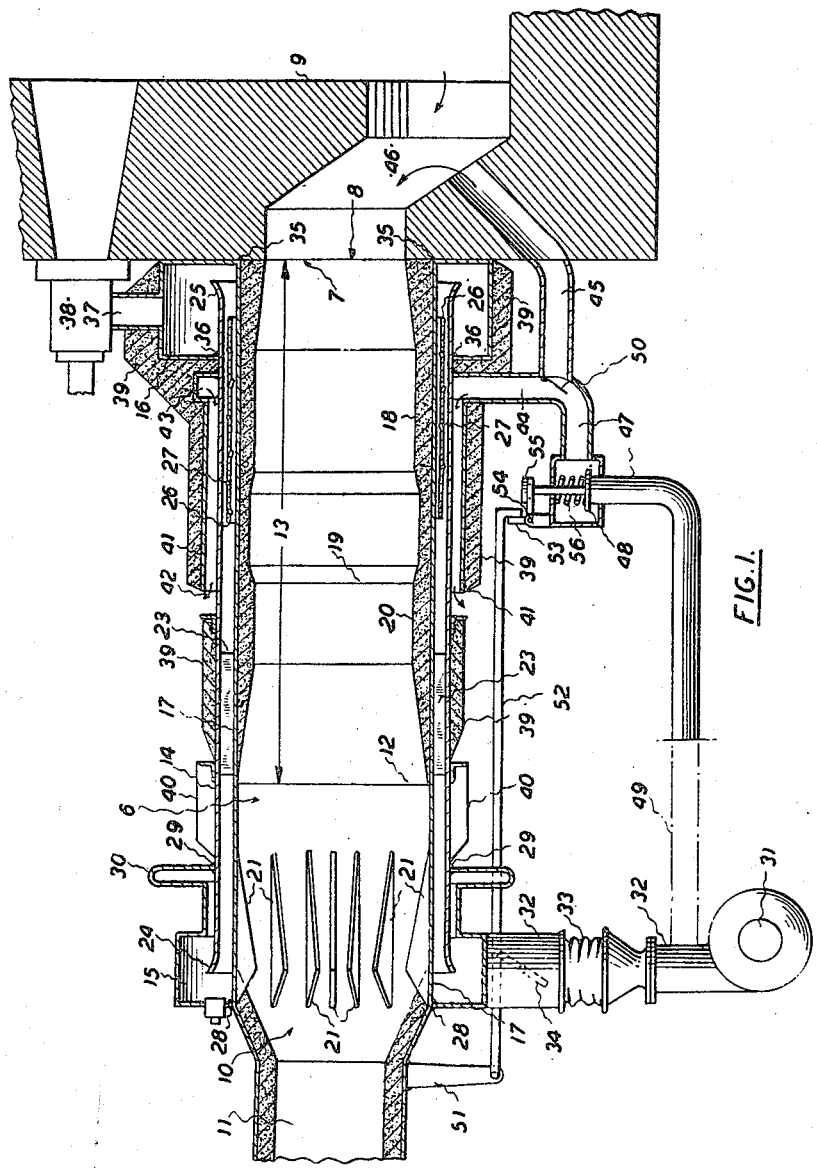
Fig. 1 is a sectional side elevation of a recuperator.

Referring to Fig. 1 the conduit (indicated generally by numeral 6) has its entrance end 7 adapted to receive hot flue-gas from the flue-gas outlet 8 of a furnace, a part of which is indicated by wall 9. The other end 10 of the conduit is in communication with atmosphere either directly or by way of a chimney or the like, a part of which is indicated at 11. The internally unobstructed radiant heating zone incorporated in the conduit 6 may extend the full length of said conduit or a part of that length. In the arrangement subject of Fig. 1 the "radiation" zone ends in or about the line marked 12 and its extent is as indicated by span 13. The radiation zone extends from its receiving end 7 to a point 12 such that (having regard to the flue-gas temperature at that point) the capacity of the flue-gas at the outlet end 12 of the zone, for disseminating heat by radiation, is substantially equal to or not less than its capacity to give up heat by convection and conduction. The conduit 6 is surrounded by a shell 14. The space between the conduit and the shell constitutes a gas heating passage. Gas to be heated enters the passage by way of an inlet box 15, and leaves said passage by way of an outlet box 16.

The conduit 6 consists of a metal casing 17 and a refractory lining 18. This lining is varied in thickness or composition in such manner as to provide adequate protection for the casing 17 against the varying temperatures obtaining within the conduit. The casing 17 may be similarly varied in regard to its heat resisting properties. For example, from the plane represented by line 7 to about the plane represented by line 19, the casing may be made of heat-resistant steel and the thickness of the corresponding portion of the lining may decrease as shown. The remainder of the casing may be made of ordinary steel, and hence the lining is correspondingly thickened, as shown at 20, and may then die away in thickness as it approaches the outlet end 10 of the conduit. Beyond the outlet end 12 of the radiation zone, the conduit may incorporate means for recovering heat by convection and conduction. These means may consist of fins 21.

The shell 14 which surrounds the conduit is closely and evenly laterally spaced thereabout. Uniformity of lateral spacing is maintained by spacer fins 23 which are fixed to the shell interior or the conduit exterior. The ends 24 and 25 of shell 14 are preferably flared as shown. The flaring at 24 has the effect of reducing entrance pressure loss, and that at 25 enables recovery of pressure energy by gradual reduction of gas velocity. As shown, the ends of the shell extend for a substantial distance into the inlet and outlet boxes, so that the cooling air is directed onto the parts of the conduit inside the boxes which are therefore substantially as effective for heat transfer purposes as the remainder of the conduit surface. This design also prevents overheating of the conduit inside the said boxes. In high temperature installations, for example, where flue-gas temperatures of from 2,500° to 3,200° F. or more, are to be dealt with, it is desirable to include a heat absorbing and emitting element in the hotter end of the gas heating passage existing between the shell and the conduit. Such an element may consist of a thin metal sleeve 26 having a multiplicity of small tongues 27 projecting therefrom in order to create turbulence of throughgoing gas.

The inlet box 15 surrounds the entrance to the gas heating passage. It is fluidtightly fixed to the casing 17 at 28, and to the shell 14 at 29. Box 15 is made sufficiently flexible to accommodate differential expansion between casing 17 and shell 14. For preference said box is partly composed of a flexible bellows member 30 to take care of the mentioned differential expansion. The box 15 receives gas to be heated from a pump 31 by way of a feed pipe 32. This feed pipe includes a flexible portion 33 to enable free movement of box 15 as a result of conduit and/or shell expansion. Feed pipe 32 also houses a valve 34 to enable the rate and pressure of gas infeed to the gas heating passage to be varied as required.

The outlet box 16 surrounds the outlet end of gas heating passage. It is fluidtightly fixed to to the casing 17 at 35, and to the shell 14 at 36. Box 16 may be made sufficiently rigid to ensure that differential expansion between the shell and the conduit is manifested in maximum in the vicinity of inlet box 15. The outlet box 16 is furnished with a duct 37 which leads to a burner assembly contained within housing 38.

The recuperator is externally lagged, as indicated at 39, so that under normal working conditions heat losses may be minimised, but is provided with means for exercising a cooling effect on the recuperator in the event of the flue-gas temperature rising to an unsafe degree, or the air supply being interrupted, to relieve the overheating.

Still referring to Fig. 1 it will be noted that a portion of the shell 14 (optionally having heat dissipating fins 40 thereon) is unlagged, and that the inlet box 15 is also unlagged. These unlagged parts are situated on the cooler side of plane 12 which (as already stated herein) may be regarded as defining the cooler end of the radiant heating zone. Because of this, under normal operating temperatures, the heat loss by radiation to atmosphere from the unlagged parts is practically negligible. When, however, the flue-gas temperatures rise appreciably above normal, the radiant heating zone may be said to extend towards the conduit end 10, and in that event the unlagged parts soon become effective radiators. The more the flue-gas temperature rises the very much greater does the radiating ability of the unlagged surfaces become (the radiation being proportional to the absolute temperature raised to the fourth power) and consequently the cooling effect thus automatically obtained, rapidly negatives overheating and rapidly dies away when normal flue-gas temperatures again prevail.

The construction shown in Fig. 1 illustrates further cooling devices which while shown in supplement to the radiation cooling means just previously described, may be employed in substitution therefor. These further cooling devices enable a stream of cooling fluid (such as air) to be directed as a cool diluent into the flue-gas issuing from the furnace, and/or into heat exchange relationship with the exterior of the shell 14.

The further cooling devices comprise a jacket casing 41 forming a cooling trunk having one end 42 open to atmosphere, and the other end 43 open to an air feed pipe 44. A second air feed pipe 45 opens to the furnace flue duct 46 leading to outlet 8. The two feed pipes 44 and 45 branch into an air duct 47 which includes a control valve 48. Duct 47 is connected to an air pump or other source of air under pressure. If the recuperator is being used for the preheating of air, the duct 47 may be branched into the feed pipe 32, as indicated by dotted lines at 49, so that the pump 31 may then become the source of both feed air and cooling air.

The feed pipes 44 and 45 are preferably equipped with valve devices (such as flap valve indicated at 50) whereby the air output of duct 47 may be allocated to the feed pipes in selected proportion, or directed into either one of these pipes to the exclusion of the other. It follows from this, that if desired, the integers herein numbered 41 to 44 may be omitted from the construction, and in such case air cooling may be effected entirely by dilution of flue-gas, with cool air, by way of duct 47 and feed pipe 45. Alternatively, the pipe 45 may be omitted or blanked off, and in such case air cooling may be effected entirely by means of the duct 47 and the integers 41 to 44.

The valve 48 may be operated manually or otherwise. For preference it is automatically operable in response to longitudinal extension of the conduit 6 as a result of expansion due to overheating. To this end a bracket 51 is fixed relative to the conduit, and this bracket is equipped with a pull rod 52 which engages a bell crank 53 fulcrumed at 54. The bell crank engages a head 55 on the stem of valve 48 and said valve is spring loaded as indicated at 56 or by a dead weight (not shown). When the conduit extends by expansion, the bracket 51, pull rod 52, bell crank 53 and head 55 operate the open valve 48. When the conduit contracts the spring 56 or dead weight recloses valve 48.

Although in Fig. 1 the recuperator is shown to be disposed about a horizontal axis, it will be appreciated that the recuperator may be disposed vertically or otherwise non-horizontally.

Figs. 2 and 3 illustrate vertically disposed recuperator which, as previously indicated herein, is suitable for a furnace the flue-gases of which issue at relatively low temperature.

The conduit (indicated generally by numeral 57) has its entrance end 58 adapted to receive hot flue-gas from the flue-gas outlet 59 of a furnace, a part of which is indicated at 60. The other end 61 of the conduit is in direct communication with atmosphere and is furnished with a movable cover 62 of conventional type. The internally unobstructed radiation zone formed by a part of the conduit 57 is indicated by span 63.

It will be appreciated that in any of the embodiments of the invention described herein, it is not intended that the indicated cooler-end limits of the several radiation zones be regarded as fixed planes beyond which no radiation occurs, but rather as vicinities beyond which recovery of heat by radiation ceases to be more efficient, or markedly more efficient, than recovery of available heat by direct contact of flue-gas with the conduit inner surface. This lack of distinctness in the cooler-end limit of the radiation zone is particularly present in the recuperator construction subject of Figs. 2 and 3, owing to the relatively small difference between the flue-gas temperatures obtaining at the ends 58 and 61. Because of this it may be noted that while appreciable radiation may occasionally or even frequently occur beyond the cooler-end of span 63, the said span represents a conduit zone in which, under normal working conditions, economically advantageous radiation will invariably take place, and that beyond the cooler-end of span 63 the said span represents a conduit zone in which, under normal working conditions, economically advantageous radiation will invariably take place, and that beyond the cooler-end of span 63 useful radiation ability rapidly dies away in favour of flue-gas heat recovery by convection and conduction. Having regard to the foregoing, it is desirable that beyond the cooler-end of zone 63 the conduit be equipped with one or more deflector plates 64 (similar to that numbered 22 in Fig. 1) whereby the bulk of through-going flue-gas may be directed into close contact with the conduit walls. It may be further noted that while the presence of the deflector plates 64 would appear to impose a considerable obstruction of the flue-gas stream, such is not the case, because, with a vertically disposed conduit such as 57 flue-gases suffer a strong updraft, and as the gases leave the radiation zone 63 they are slow moving as a result of extensive heat loss (and consequent contraction) by radiation. A minor advantage due to the deflector plates such as 64 is that they act as conductors (and as radiators) of heat to the adjacent portions of the conduit walls.

The conduit 57 is surrounded by a shell 65. The space between the conduit and the shell constitutes a gas heating passage which at one end has a gas inlet box 66, and at its other end, a gas outlet box 67.

The conduit consists of a metal casing 68 and a refractory lining 69. The thickness and/or composition of lining 69, and the extent of its intrusion into the casing 68 are made consistent with necessity for protection of the casing having regard to the working flue-gas temperatures obtaining therein. The bottom end of the conduit is sealed by a band 70 having a knife edge which dips into a sand trough 71 surrounding the outlet 59.

The conduit 57 and the shell 65 are supported on brackets 72 resting on fixed beams 73. This method of suspension has the benefit that the hottest portions of the conduit and the shell are least stressed by the dead weight thereof. Spacer fins 74 fixed to the shell 65 or the casing 68 maintain uniform spacing of those members. The ends of shell 65 are preferably flared as indicated at 75.

The inlet box 66 is similar to that numbered 15 in Fig. 1, and is similarly fed with gas to be heated by a feed pipe 76. The outlet box 67 has an outlet duct 77 adapted for connection to a burner assembly.

The shell 65 is preferably lagged as shown at 78, but has an unlagged portion 79 for safety cooling purposes in like manner to that already described in connection with Fig. 1.

Figure 4:
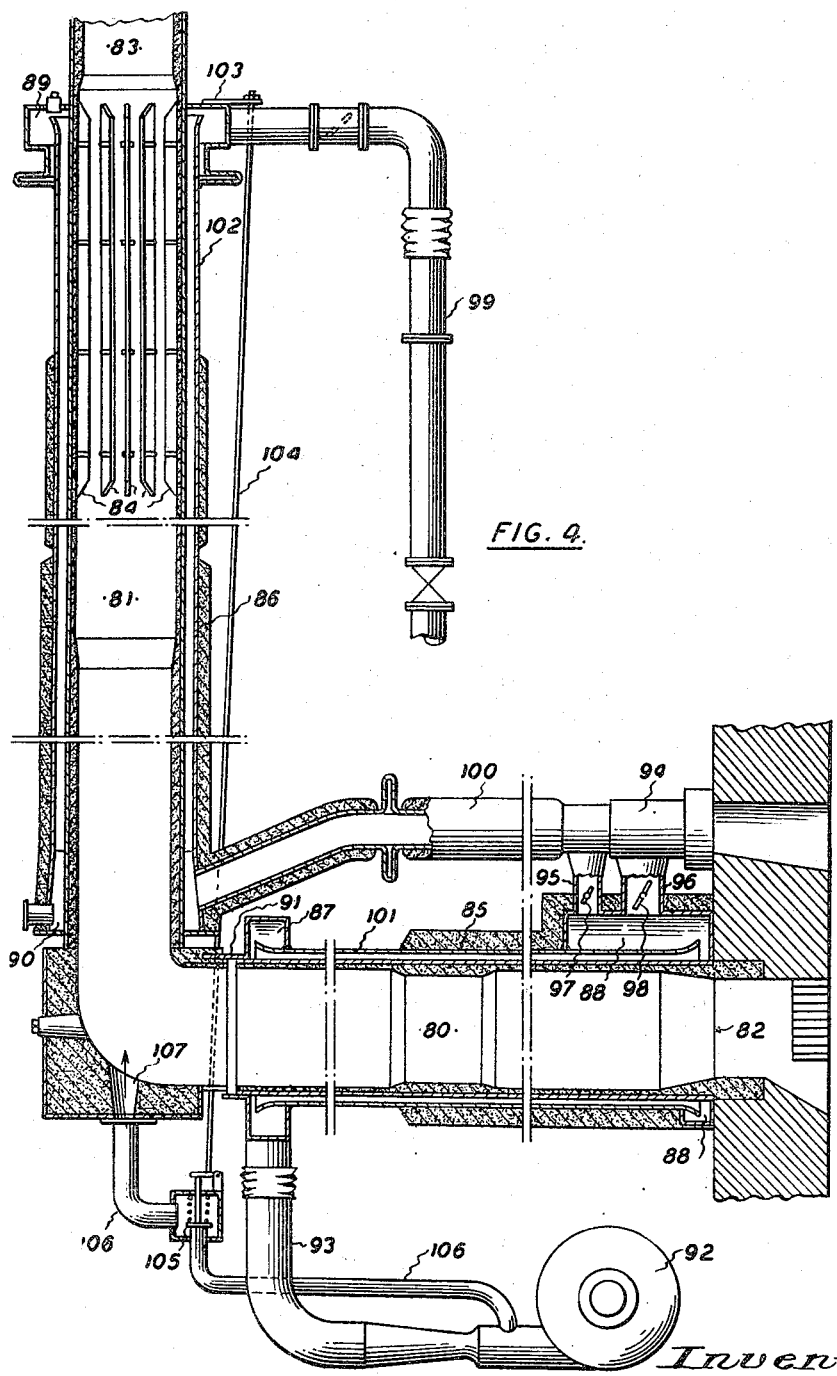
Fig. 4 is a sectional side elevation of a recuperator applicable for the preheating of air and fuel gas to a batch type heating furnace of the soaking pit type.

The recuperator shown in Fig. 4 comprises a flue-gas conduit consisting of a horizontal section 80 and an upright section 81. Section 80 receives flue-gas directly from the furnace outlet 82 and portion 81 has its upper end 83 in communication with atmosphere. The conduit radiation zone extends from the outlet 82 to approximately the bottom ends of conduction fins 84. The conduit is surrounded by two shells 85 and 86. Shell 85 together with the horizontal section of the conduit defines an air heating passage whereof the ends are respectively surrounded by an air inlet box 87 and an air outlet box 88. Shell 86 together with the upright section of the conduit defines a fuel-gas heating passage whereof the ends are respectively surrounded by a fuel gas inlet box 89 and a fuel gas outlet box 90. The conduit sections 80 and 81 are preferably connected by an expansion joint indicated at 91.

Inlet box 87 receives air from a pump 92 by way of pipe 93, and outlet box 88 delivers air to a burner assembly 94 by way of primary air duct 95 and secondary air duct 96. These ducts include flow control valves 97 and 98 as well understood.

Inlet box 89 receives fuel-gas from a pressure supply by way of pipe 99, and outlet box 90 delivers fuel-gas to the burner assembly 94 by way of pipe 100.

The conduit 80—81 is internally lined with refractory material, and the shells 85—86 are externally lagged, in substantially the same manner as already described herein. The shells have unlagged portions 101 and 102 for radiant cooling purposes, also as previously set forth herein.

The conduit may be furnished with cooling means whereby diluent cool air is automatically injected into the flue-gas stream in response to expansion of a portion of said conduit as a result of overheating thereof. Such means may comprise a bracket 103 fixed in relation to section 81 and a pull rod 104 adapted for operation of a spring loaded valve 105 in an air feed pipe 106 which branches from pipe 93 and enters the conduit at 107.

Figure 5:
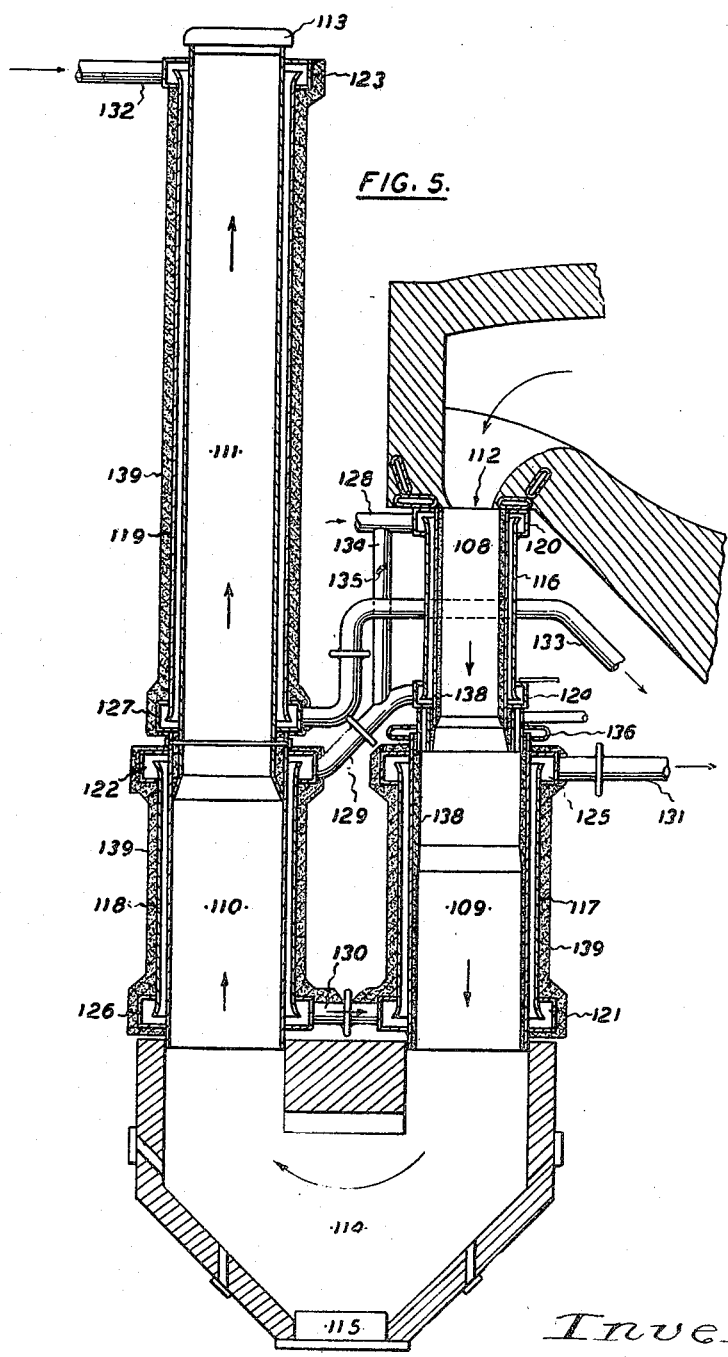
Fig. 5 is a sectional side elevation of a recuperator applicable for the preheating of air and fuel gas to an open hearth melting furnace.

Fig. 5 illustrates an embodiment of the invention as applied to an open hearth or other very high temperature furnace. This arrangement comprises a conduit having a down draft portion in two sections 108 and 109, and an updraft portion in two sections 110 and 111. Section 108 receives flue-gas directly from the furnace outlet 112, and the upper end of section 111 opens directly to atmosphere. This upper end may be furnished with a removable cover as indicated at 113. The updraft and downdraft portions of the conduit are connected in series by an ashpit 114 in which non-gaseous ingredients in the flue "gas" may accumulate and be removed by way of a door or the like as indicated at 115. The conduit radiation zone extends from the outlet 112 to the upper end of the updraft portion or to a point intermediate of the ends of said updraft portion.

The conduit sections 108 to 111 are respectively surrounded by shells 116, 117, 118 and 119. These shells, together with their related conduit sections, define gas heating passages which respectively commence in inlet boxes 120, 121, 122 and 123, and end in outlet box 124, 125, 126 and 127.

Inlet box 120 receives air under pressure by way of pipe 128. Air leaves outlet box 124 and enters inlet box 122 through pipe 129. Air leaves outlet box 126 and enters inlet box 121 through pipe 130. Air leaves outlet box 125 and proceeds to a burner assembly (not shown) by way of pipe 131. Fuel gas under pressure enters inlet box 123 through pipe 132, and leaves outlet box 127 through pipe 133 which leads to the said burner assembly.

Pipes 128 and 129 are preferably joined by a by-pass pipe 134 having a control valve 135 therein. This pipe, and the control valve, enable a selected fraction of the air proceeding along pipe 128 to be by-passed directly to the inlet box 122. The purpose of this arrangement is to enable the air heating passage associated with section 108 to be periodically air-starved so that the temperature in section 108 may rise sufficiently to melt any slag or clinker deposits thereon, and thus enable such deposits to fall into the pit 114. The fact that the furnace outlet 112 inwardly overhangs the conduit entrance end, reduces likelihood of such deposits occurring. This, however, is an incidental advantage in having the conduit interior of larger diameter or cross-sectional area than the furnace outlet, as it is preferable (in all of the constructions herein described) for the internal cross-sectional area of the conduit, or at least the radiation zone thereof, to be not less than that of the furnace outlet, in order the flue-gas stream within the conduit (or at least in the radiation zone) may be relatively slow-moving and un-impeded.

The sections 108 and 109 are joined by expansion joints as indicated at 136. The conduit is internally lined with refractory material 138 and the shells are externally lagged 139 as and where required, in substantially the same manner as already described herein.

In the construction shown in Fig. 5 the hottest flue-gas zone 108 is without external lagging (to provide for safety cooling by radiation) whereas in the constructions subject of Figs. 1 to 4 the unlagged portions of the shells are situated at the cooler ends thereof. The cold air passes first through shell 116, keeping—under normal operating conditions—radiation losses small and resulting in rapid cooling of the flue-gases before they enter the next zone 109. When air supply through shell 116 is interrupted cooling of the flue-gases will occur by external radiation of shell 116, temperature of which will rise above its normal working level.

What I claim is:

1. A combustion furnace recuperator comprising a conduit, an entrance end to said conduit adapted to receive flue gases exhausting from the flue-gas outlet of a furnace, an outlet end to said conduit communicating with the atmosphere, an unobstructed radiation zone in said conduit having one end substantially coincident with said entrance end, a shell which closely surrounds said conduit and therewith forms a gas heating passage, a gas inlet box which surrounds one end of said passage, a gas outlet box which surrounds the other end of said passage, means for feeding gas under pressure into said inlet box, means for conducting gas from said outlet box, and outwardly flared ends to said shell disposed inside and extending for a substantial distance within said boxes.

2. A combustion furnace recuperator comprising a conduit, an entrance end to said conduit adapted to receive flue gases exhausting from the flue-gas outlet of a furnace, an outlet end to said conduit communicating with the atmosphere, an unobstructed radiation zone in said conduit having one end substantially coincident with said entrance end, a shell which closely surrounds said conduit and therewith forms a gas heating passage, a gas inlet box which surrounds one end of said passage, a gas outlet box which surrounds the other end of said passage, means for feeding gas under pressure into said inlet box, means for conducting gas from said outlet box, and thermal lagging means arranged externally of said shell and extending over a portion only of said shell.

3. A combustion furnace recuperator comprising a conduit, an entrance end to said conduit adapted to receive flue gases exhausting from the flue-gas outlet of a furnace, an outlet end to said conduit communicating with the atmosphere, an unobstructed radiation zone in said conduit having one end substantially coincident with said entrance end, a shell which closely surrounds said conduit and therewith forms a gas heating passage, a gas inlet box which surrounds one end of said passage, a gas outlet box which surrounds the other end of said passage, means for allowing differential expansion between said conduit and shell, means for feeding gas under pressure into said inlet box, means for conducting gas from said outlet box, a feed pipe connected at one end to the inlet end of said conduit, pump devices for injecting cool air into the other end of said pipe, a control valve associated with said feed pipe and link mechanism between the outlet end of the conduit and the control valve whereby the control valve is opened upon excessive expansion of said conduit.

4. A combustion furnace recuperator comprising a conduit, an entrance end to said conduit adapted to receive flue gases exhausting from the flue-gas outlet of a furnace, an outlet end to said conduit communicating with the atmosphere, an unobstructed radiation zone in said conduit having one end substantially coincident with said entrance end, a shell which surrounds said conduit and therewith forms a gas heating passage, a gas inlet box which surrounds one end of said passage, a gas outlet box which surrounds the other end of said passage, means for feeding gas under pressure into said inlet box, means for conducting gas from said outlet box, a feed pipe connected at one end to the inlet end of said conduit, pump devices for injecting cool air into the other end of said pipe, a spring loaded control valve in said feed pipe, and pull-rod mechanism connected to operate said control valve in response to expansive movement of a part of the recuperator.

5. A combustion furnace recuperator comprising a conduit, an entrance end to said conduit adapted to receive flue gases exhausting from the flue-gas outlet of a furnace, an unobstructed radiation zone in said conduit having one end substantially coincident with said entrance end, a shell which surrounds said conduit and therewith forms a gas heating passage, a gas inlet box which surrounds one end of said passage, a gas outlet box which surrounds the other end of said passage, means for feeding gas under pressure into said inlet box, means for conducting gas from said outlet box, a jacket casing surrounding said shell open at one end to the atmosphere, a feed pipe connected to the other end of said jacket casing, pump devices for injecting cool air into said feed pipe, and a control valve in said feed pipe.

6. A combustion furnace recuperator comprising a conduit, an entrance end to said conduit adapted to receive flue gases exhausting from the flue-gas outlet of a furnace, an unobstructed radiation zone in said conduit having one end substantially coincident with said entrance end, a shell which surrounds said conduit and therewith forms a gas heating passage, a gas inlet box which surrounds one end of said passage, a gas outlet box which surrounds the other end of said passage, means for feeding gas under pressure into said inlet box, means for conducting gas from said outlet box, a jacket casing surrounding said shell open at one end to the atmosphere, a feed pipe connected to the other end of said jacket casing, pump devices for injecting cool air into said feed pipe, a spring loaded control valve in said feed pipe, and pull-rod mechanism connected to operate said control valve in response to expansive movement of a part of the recuperator.

7. A combustion furnace recuperator comprising a first recuperator section comprising a first conduit, an entrance end to said first conduit adapted to receive flue gases exhausting from the flue gas outlet of a furnace, an outlet end to said first conduit, an unobstructed radiation zone in said first conduit having one end substantially coincident with said entrance end, an unlagged shell surrounding said first conduit and therewith forming a gas heating passage, a gas inlet box surrounding one end of said passage, a gas outlet box surrounding the other end of said passage, a second recuperator section comprising a second conduit, an entrance end to said second conduit connected to the outlet end of said first conduit, an outlet end to said second conduit communicating with the atmosphere, an unobstructed radiation zone in said second conduit having one end substantially coincident with said entrance end to said second conduit, a lagged shell surrounding said second conduit and therewith forming a gas heating passage, a gas inlet box surrounding one end of said last passage, a gas outlet box surrounding the other end of said last passage, means for feeding gas under pressure into said inlet boxes, and means for conducting gases from said outlet boxes.

8. A combustion furnace recuperator comprising a conduit, an entrance end to said conduit adapted to receive flue gases exhausting from the flue-gas outlet of a furnace, an outlet end to said conduit communicating with the atmosphere, an unobstructed radiation zone in said conduit having one end substantially coincident with said entrance end, a shell which surrounds said conduit and therewith forms a gas heating passage, a gas inlet box which surrounds one end of said passage, a gas outlet box which surrounds the other end of said passage, means for feeding gas under pressure into said inlet box, means for conducting gas from said outlet box, thermal lagging means arranged externally of said shell and extending over a portion only of said shell, a flexible connection between the said inlet box and said shell, a cooling trunk surrounding a portion of said shell and which is open to the atmosphere, an air feed pipe connected to said trunk, a second air feed pipe in communication with the interior of said conduit, an air duct connected to both said feed pipes, means for injecting cool air into said duct, a spring loaded control valve in said duct, and pull-rod mechanism to open said valve in response to expansive movement of a part of said conduit.

9. A combustion furnace recuperator comprising a vertical conduit, an entrance end to said conduit adapted to receive flue gases exhausting from the flue-gas outlet of a furnace, an outlet end to said conduit communicating with the atmosphere, an unobstructed radiation zone in said conduit having one end substantially coincident with said entrance end, a shell which surrounds said conduit and therewith forms a gas heating passage, a gas inlet box which surrounds one end of said passage, a gas outlet box which surrounds the other end of said passage, means for feeding gas under pressure into said inlet box, means for conducting gas from said outlet box, thermal lagging means arranged externally of said shell and extending over a portion only of said shell, means for supporting said shell and said conduit intermediately of their ends, a knife-edge sealing band at the bottom of said conduit, and a sand trough surrounding the said furnace outlet and into which the said sealing band dips.

10. A combustion furnace recuperator comprising a downdraft recuperator section comprising a first conduit, the upper end to said first conduit being connected to the flue gas outlet of a furnace, an outlet end at the bottom of said first conduit, an unobstructed radiation zone in said first conduit having one end substantially coincident with said upper end, an unlagged shell surrounding said first conduit and therewith forming a gas heating passage, a gas inlet box surrounding one end of said passage, a gas outlet box surrounding the other end of said passage, an updraft recuperator section comprising a second conduit, an entrance end to said second conduit at the lower end of said conduit, an outlet end to said second conduit communicating with the atmosphere, an unobstructed radiation zone in said second conduit having one end substantially coincident with said entrance end to said second conduit, a lagged shell surrounding said second conduit and therewith forming a gas heating passage, a gas inlet box surrounding one end of said last passage, a gas outlet box surrounding the other end of said last passage, means for feeding gas under pressure into said inlet boxes, means for conducting gases from said outlet boxes, and an ashpit connecting the outlet end of said first conduit and the entrance end of said second conduit.

11. A combustion furnace recuperator comprising a conduit, an entrance end to said conduit adapted to receive flue gases exhausting from the flue-gas outlet of a furnace, an outlet end to said conduit communicating with the atmosphere, an unobstructed radiation zone in said conduit having one end substantially coincident with said entrance end, a shell which surrounds said conduit and therewith forms a gas heating passage, a gas inlet box which surrounds one end of said passage, a gas outlet box which surrounds the other end of said passage, means for feeding gas under pressure into said inlet box, means for conducting gas from said outlet box, outwardly flared ends to said shell disposed inside said boxes, and thermal lagging means arranged externally of said shell and extending over a portion only of said shell.

12. A combustion furnace recuperator comprising a conduit, an entrance end to said conduit adapted to receive flue gases exhausting from the flue-gas outlet of a furnace, an outlet end to said conduit communicating with the atmosphere, an unobstructed radiation zone in said conduit having one end substantially coincident with said entrance end, a shell which surrounds said conduit and therewith forms a gas heating passage, a gas inlet box which surrounds one end of said passage, a gas outlet box which surrounds the other end of said passage, means for feeding gas under pressure into said inlet box, means for conducting gas from said outlet box, outwardly flared ends to said shell disposed inside said boxes, thermal lagging means arranged externally of said shell, and a plurality of fins attached to said conduit and extending into the said conduit between the radiation zone and the outlet end of said conduit.

13. A combustion furnace recuperator comprising a conduit, an entrance end to said conduit adapted to receive flue gases exhausting from the flue-gas outlet of a furnace, an outlet end to said conduit communicating with the atmosphere, an unobstructed radiation zone in said conduit having one end substantially coincident with said entrance end, a shell which surrounds said conduit and therewith forms a gas heating passage, a gas inlet box which surrounds one end of said passage, a gas outlet box which surrounds the other end of said passage, means for feeding gas under pressure into said inlet box, means for conducting gas from said outlet box, outwardly flared ends to said shell disposed inside said boxes, thermal lagging means arranged externally of said shell, a feed pipe connected at one end to the inlet end of said conduit, pump devices for injecting cool air into the other end of said pipe, and a control valve associated with said feed pipe.

14. A combustion furnace recuperator comprising a conduit, a shell which closely surrounds the conduit and therewith forms a gas heating passage, a gas inlet box which surrounds one end of said passage, a gas outlet box which surrounds the other end of said passage, means for allowing differential expansion between the conduit and shell, the ends of said shell extending for a substantial distance inside said inlet and outlet boxes and being flared outwardly, and lagging means extending externally over a part only of said shell.

15. A combustion furnace recuperator comprising a conduit, a shell which closely surrounds the conduit and therewith forms a gas heating passage, a gas inlet box which surrounds one end of said passage, a gas outlet box which surrounds the other end of said passage, and a flexible coupling between at least one of the inlet and outlet boxes and the said shell, a source of cool air, a feed pipe between the said source and the inlet end of the conduit, a control valve in the feed pipe, and pull-rod mechanism between the outlet end of the conduit and the control valve to open the control valve upon excessive expansion of the conduit.

16. A combustion furnace recuperator comprising a conduit, a shell which closely surrounds the conduit and therewith forms a gas heating passage, a gas inlet box which surrounds one end of said passage, a gas outlet box which surrounds the other end of said passage, the ends of said shell extending for a substantial distance inside said inlet and outlet boxes and being flared outwardly.

HANS ESCHER.

REFERENCES CITED

The following references are of record in the file of this patent:

UNITED STATES PATENTS

| Number | Name | Date |
|---|---|---|
| 191,747 | Barrett | June 12, 1877 |
| 508,689 | Engelman | Nov. 14, 1893 |
| 781,308 | Smith | Jan. 31, 1905 |
| 1,344,438 | Buell et al. | June 22, 1920 |
| 1,647,570 | Kling | Nov. 1, 1927 |
| 1,690,326 | Bolling et al. | Nov. 6, 1928 |
| 1,704,029 | Bailey | Mar. 5, 1929 |
| 1,782,430 | Kelley et al. | Nov. 25, 1930 |
| 2,053,037 | Lintern | Sept. 1, 1936 |
| 2,130,306 | Lintern | Sept. 13, 1938 |

FOREIGN PATENTS

| Number | Country | Date |
|---|---|---|
| 27,302 | Sweden | Dec. 18, 1907 |
| 15,462 | Australia | Sept. 5, 1928 |